United States Patent
Krishnamurthy et al.

(10) Patent No.: US 8,086,502 B2
(45) Date of Patent: Dec. 27, 2011

(54) METHOD AND SYSTEM FOR MOBILE PUBLICATION

(75) Inventors: Vishwa Krishnamurthy, Sunnyvale, CA (US); Srinivasan Venkatesan, San Jose, CA (US)

(73) Assignee: eBay Inc., San Jose, CA (US)

(*) Notice: Subject to any disclaimer, the term of this patent is extended or adjusted under 35 U.S.C. 154(b) by 425 days.

(21) Appl. No.: 12/058,827

(22) Filed: Mar. 31, 2008

(65) Prior Publication Data

US 2009/0248742 A1 Oct. 1, 2009

(51) Int. Cl.
*G06Q 30/00* (2006.01)
(52) U.S. Cl. ............... 705/26.5; 705/26.8; 707/784
(58) Field of Classification Search .................. None
See application file for complete search history.

(56) References Cited

U.S. PATENT DOCUMENTS

| | | | |
|---|---|---|---|
| 5,781,899 A | 7/1998 | Hirata | |
| 6,282,517 B1* | 8/2001 | Wolfe et al. | 705/36 R |
| 6,366,696 B1* | 4/2002 | Hertz et al. | 382/183 |
| 6,512,919 B2* | 1/2003 | Ogasawara | 455/422.1 |
| 6,563,959 B1 | 5/2003 | Troyanker | |
| 6,640,214 B1* | 10/2003 | Nambudiri et al. | 705/21 |
| 6,868,433 B1* | 3/2005 | Philyaw | 709/203 |
| 7,027,652 B1* | 4/2006 | I' Anson | 382/218 |
| 7,593,602 B2 | 9/2009 | Stentiford | |
| 7,958,012 B2* | 6/2011 | Hudak et al. | 705/37 |
| 2002/0049641 A1* | 4/2002 | Kopelman et al. | 705/26 |
| 2002/0138374 A1* | 9/2002 | Jennings et al. | 705/29 |
| 2002/0165801 A1* | 11/2002 | Stern et al. | 705/27 |
| 2003/0126026 A1* | 7/2003 | Gronberg et al. | 705/26 |
| 2004/0099741 A1* | 5/2004 | Dorai et al. | 235/462.08 |
| 2004/0262391 A1* | 12/2004 | Harris et al. | 235/454 |
| 2005/0004838 A1* | 1/2005 | Perkowski et al. | 705/14 |
| 2005/0010486 A1* | 1/2005 | Pandhe | 705/26 |
| 2005/0011957 A1* | 1/2005 | Attia et al. | 235/462.46 |
| 2005/0083413 A1* | 4/2005 | Reed et al. | 348/211.99 |
| 2005/0131799 A1* | 6/2005 | Clay et al. | 705/37 |
| 2005/0162523 A1 | 7/2005 | Darrell et al. | |
| 2005/0283425 A1* | 12/2005 | Grove et al. | 705/37 |
| 2006/0006238 A1* | 1/2006 | Singh | 235/462.46 |

(Continued)

FOREIGN PATENT DOCUMENTS

CN 102090080 6/2011

OTHER PUBLICATIONS

"U.S. Appl. No. 12/406,016, Non Final Office Action mailed Jun. 21, 2011", 21 pgs.

(Continued)

*Primary Examiner* — Pierre Vital
*Assistant Examiner* — Augustine Obisesan
(74) *Attorney, Agent, or Firm* — Schwegman, Lundberg & Woessner, P.A.

(57) ABSTRACT

In a method and system for mobile publication, a captured image is accessed. A bar code is decoded from the captured image. An item associated with the bar code is identified. An item listing of the item is generated in accordance with the identifying of the item. The item listing is utilized for posting with a listing manager. One or more item listings for the item are identified. At least one item listing of the one or more item listings is provided for presentation in accordance with the searching of the one or more item listings.

25 Claims, 9 Drawing Sheets

U.S. PATENT DOCUMENTS

| | | | |
|---|---|---|---|
| 2006/0190350 A1* | 8/2006 | Maas | 705/26 |
| 2006/0206584 A1* | 9/2006 | Hyder et al. | 709/218 |
| 2007/0100713 A1* | 5/2007 | Del Favero et al. | 705/29 |
| 2007/0118430 A1* | 5/2007 | Wiseman et al. | 705/26 |
| 2008/0170810 A1 | 7/2008 | Wu et al. | |
| 2010/0241650 A1 | 9/2010 | Chittar | |

OTHER PUBLICATIONS

"International Application Serial. No. PCT/US2009/001976, International Preliminary Report on Patentability mailed Oct. 14, 2010", 5 pgs.

* cited by examiner

METHOD AND SYSTEM FOR MOBILE PUBLICATION

BACKGROUND

Users and companies typical post publication data (e.g., item listings of items for sale) via a home computer system. Users may include images or other information within the publication data.

BRIEF DESCRIPTION OF THE DRAWINGS

Some embodiments are illustrated by way of example and not limitation in the figures of the accompanying drawings in which.

DETAILED DESCRIPTION

Example methods and systems for mobile publication are described. In the following description, for purposes of explanation, numerous specific details are set forth in order to provide a thorough understanding of example embodiments. It will be evident, however, to one skilled in the art that the present invention may be practiced without these specific details.

In an example embodiment, an image may be accessed. A bar code may be decoded from the image. An item associated with the bar code may be identified. An item listing of the item may be generated in accordance with the identifying of the item. The item listing may be utilized for posting with a listing manager.

In an example embodiment, an image may be accessed. An item identified may be extracted from the image. An item associated with the item identifier may be identified. One or more item listings for the item may be identified. At least one item listing of the one or more item listings may be provided for presentation in accordance with the searching of the plurality of item listings.

In an example embodiment, an image may be accessed. A bar code may be decoded from the image. An item associated with the bar code may be identified. One or more item listings for the item may be identified. At least one item listing of the one or more item listings may be provided for presentation in accordance with the searching of the plurality of item listings.

Figure 1:
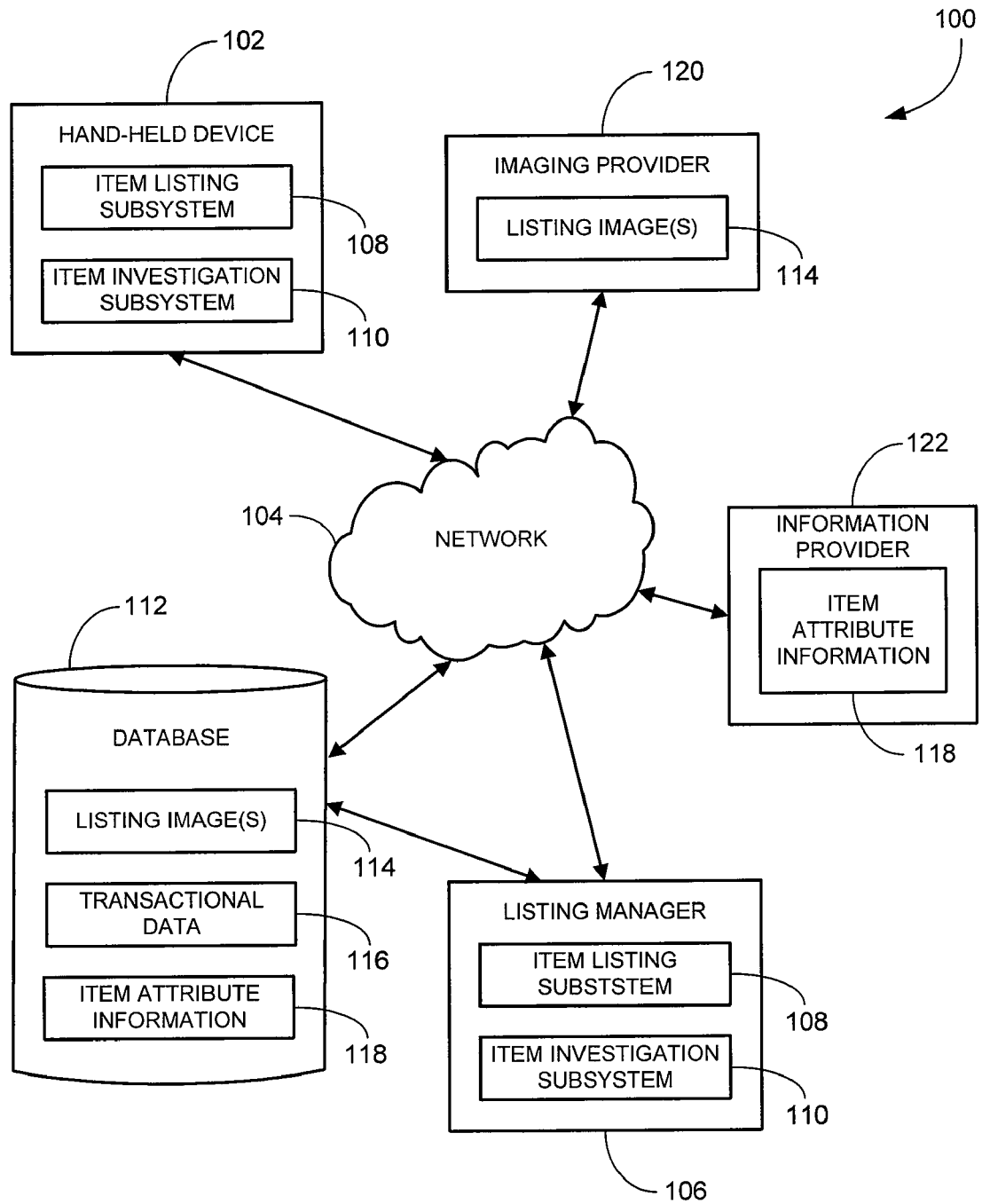
FIG. 1 is a block diagram of a system, according to an example embodiment.

FIG. 1 illustrates an example system 100 in a user may utilize a hand-held device 102 to interact over a network with a listing manager 106. The interactions may enable the user to buy and/or sell items through postings made with the listing manager 106. Example hand-held devices 102 include a mobile phone, a personal digital assistant (PDA), a gaming unit, a portable computing unit, and the like. However, other hand-held devices may also be used. The hand-held device 102 may include a camera or other type of imaging unit to record images.

The network 104 over which the hand-held device 102 and the listing manager 106 interact may be a Global System for Mobile Communications (GSM) network, an Internet Protocol (IP) network, a Wireless Application Protocol (WAP) network, a WiFi network, or a IEEE 802.11 standards network as well as various combinations thereof. Other conventional and/or later developed wired and wireless networks may also be used.

An item listing subsystem 108 and/or an item investigation subsystem 110 may be deployed with the hand-held device 102 and/or the listing manager 106. The item listing subsystem 108 may enable a user of the hand-held device 102 to utilize an item listing by the listing manager 106. The item investigation subsystem may enable a user to review item listings made available by the listing manager.

A database 112 may be coupled with the listing manager 106. The database may include one or more listing images 114, transaction data 116, and/or item attribute information 118.

The listing images 114 may be images used in an item listing to show a picture of the item. The transaction data 116 may include information regarding transactions conducted by users of the listing manager 106. The transactional data 116 may include, by way of example, pricing information for an item during a time period.

The item attribute information 118 may include information regarding a number of items. For example, the item attribute information regarding a particular item may include an edition, a number of pages, an author, chapter titles, song titles, and/or actors. Other information may also be included.

The imaging provider 120 may be a service that provides the listing images 114. The information provider 122 may be a service that provides the item attribute information 118.

Figure 2:
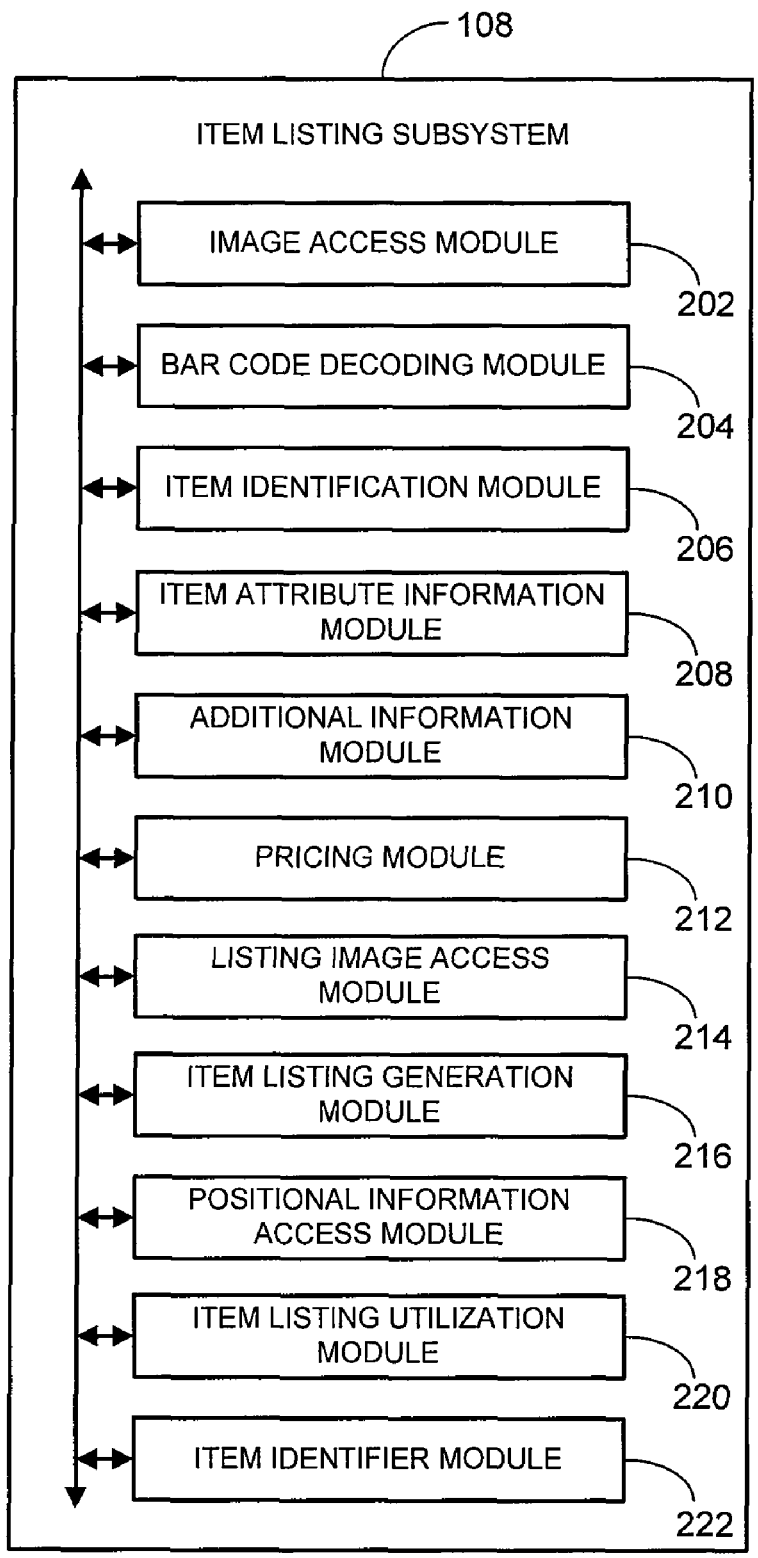
FIG. 2 is a block diagram of an example item listing subsystem that may be deployed within the system of FIG. 1 according to an example embodiment.

FIG. 2 illustrates an item listing subsystem 200 that may be deployed in the hand-held device 102 and/or the listing manager 106 of the system 100 (see FIG. 1) or otherwise deployed in another system.

The item listing subsystem 200 may include an image access module 202, a bar code decoding module 204, an item identification module 206, an item attribute information module 208, an additional information module 210, a pricing module 212, a listing image access module 214, a item listing generation module 216, a positional information access module 218, and/or an item listing utilization module 220. Other modules may also be included.

The image access module 202 accesses an image (e.g., a capture image). The image may be accessed by capturing the image associated with the item on the hand-held device 102 and/or receiving the image from the hand-held device 102.

The bar code decoding module 204 decodes a bar code from the captured image. The bar code may be one-dimensional such as a UPC bar code. The bar code may be multi-dimensional (e.g., two-dimensional bar codes such as an Aztec code, Data Matrix, Dataglyph, MaxiCode, PDF417, QR Code, Ultra Code or UCC RSS-2D bar code). Other machine readable representations of data in a visual form may also be used.

The item identification module 206 identifies an item associated with the bar code. The item attribute information module 208 receives the item attribute information 118 from a user and/or accesses the item attribute information 118 associated with the item. The item attribute information 118 may be accessed from the database 112, an information provider 122, or may be otherwise accessed.

The additional information module 210 provides a request for additional information regarding the item to the user and receives a response to the request. The additional information may include pricing information and/or the item attribute information 118.

The pricing module 212 accesses pricing information for the item during a time period (e.g., from the transactional data 116), provides a price range to the hand-held device 102 for presentation, and receives a pricing selection from the hand-held device 102. The accessed pricing information may include, by way of example, start price, end price, discounted price, and/or bid price. Other pricing information may also be included.

The listing image access module 214 accesses the listing image 114 associated with the item. The listing image 114 may be accessed from the database 112, by capturing the listing image 114 of the item, and/or by providing an image request to the imaging provider 120 and receiving the listing image 114 of the item from the imaging provider 120.

The item listing generation module 216 generates an item listing of the item in accordance with the identification of the item, the item attribute information 118, the receipt of the response, the receipt of the pricing selection, and/or the accessing of the listing image 114.

The positional information access module 218 accesses positional information from the hand-held device 102. The positional information may include, by way of example, GPS source data, GPS assisted data, triangulation data, and/or a cellular identification (ID) data in the form of location coordinates for the hand-held device 102. However, other types of positional information may also be used.

The item listing utilization module 220 utilizes the item listing for posting with the listing manager 106. The utilization may include posting the item listing directly by the listing manager and/or providing the item listing to the listing manager 106. The utilizing of the item listing may be in accordance with the receipt of the positional information.

The item identifier module 222 may extract an item identifier from an image and/or identify an item associated with the item identifier.

Figure 3:
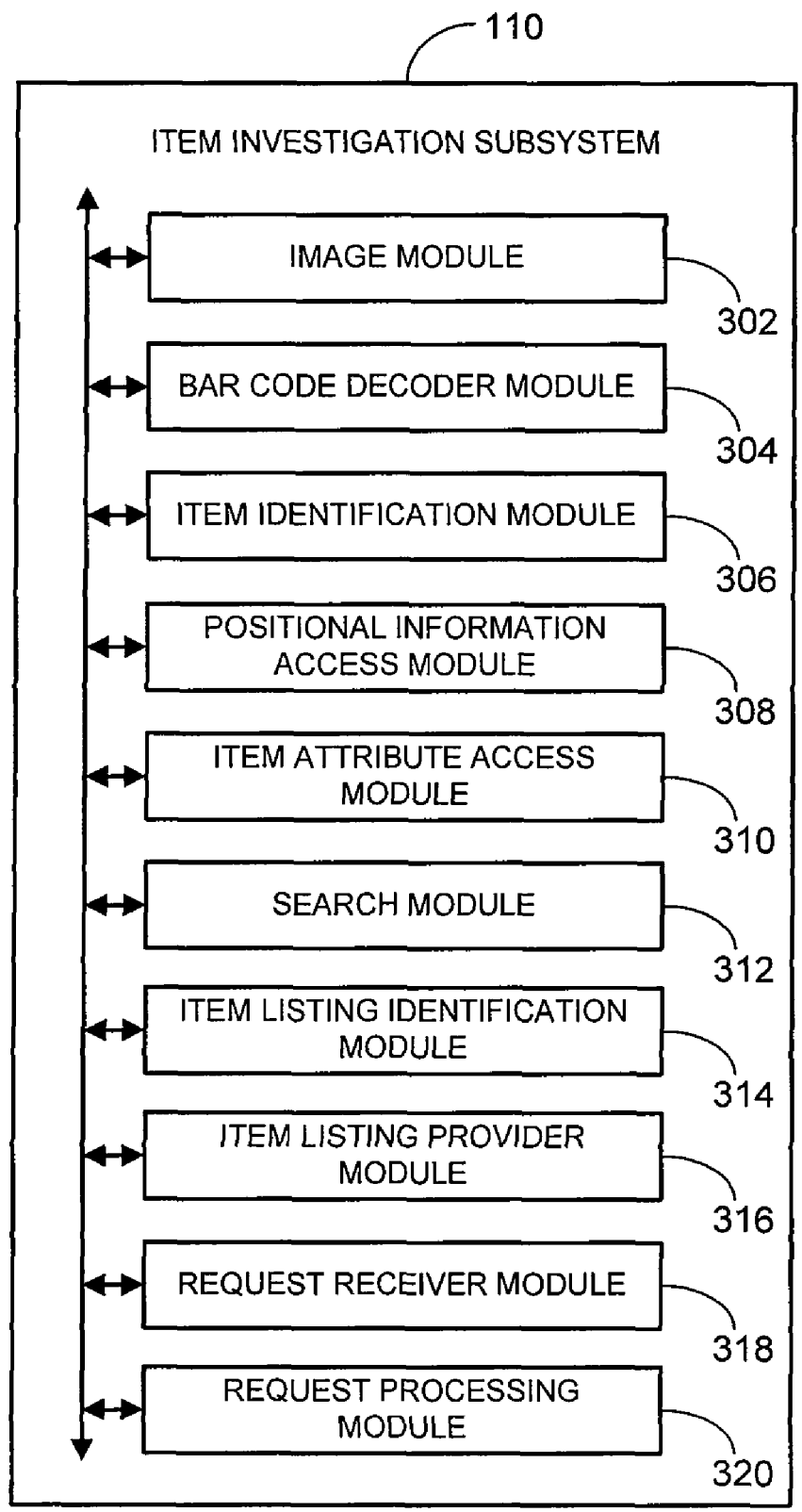
FIG. 3 is a block diagram of an example item investigation subsystem that may be deployed within the system of FIG. 1 according to an example embodiment.

FIG. 3 illustrates an item investigation subsystem 300 that may be deployed in the hand-held device 102 and/or the listing manager 106 of the system 100 (see FIG. 1) or otherwise deployed in another system.

The item investigation subsystem 300 may include an image access module 302, a bar code decoder module 304, an item identification module 306, a positional information access module 308, an item attribute access module 310, a search module 312, an item listing identification module 314, an item listing provider module 316, a request receiver module 318, and/or a request processing module 320. Other modules may also be used.

The image access module 302 accesses an image. The bar code decoder module 304 decodes a bar code from the captured image.

The item identification module 306 identifies an item associated with the bar code. The positional information access module 308 accesses positional information from a hand-held device.

The item attribute access module 310 accesses a designated item attribute associated with a user. The search module 312 searches a number of item listings for the item and/or sends a search request for the item to the listing manager 106 and receives the one or more item listings for the item.

The item listing identification module 314 identifies one or more item listings for the item. The identification of the one or more item listings for the item may be in accordance with the receipt of the positional information, the access of the designated item attribute, the search of the number of item listings, and/or the receipt of the one or more item listings from the listing manager 106.

The item listing provider module 316 provides at least one item listing of the one or more item listings for presentation in accordance with the searching of the number of item listings. The request receiver module 318 receives a transaction request (e.g., a purchase request and/or a bid request) for an item of a particular listing of the at least one item listing. The request processing module 320 processes the transaction request for the item.

Figure 4:
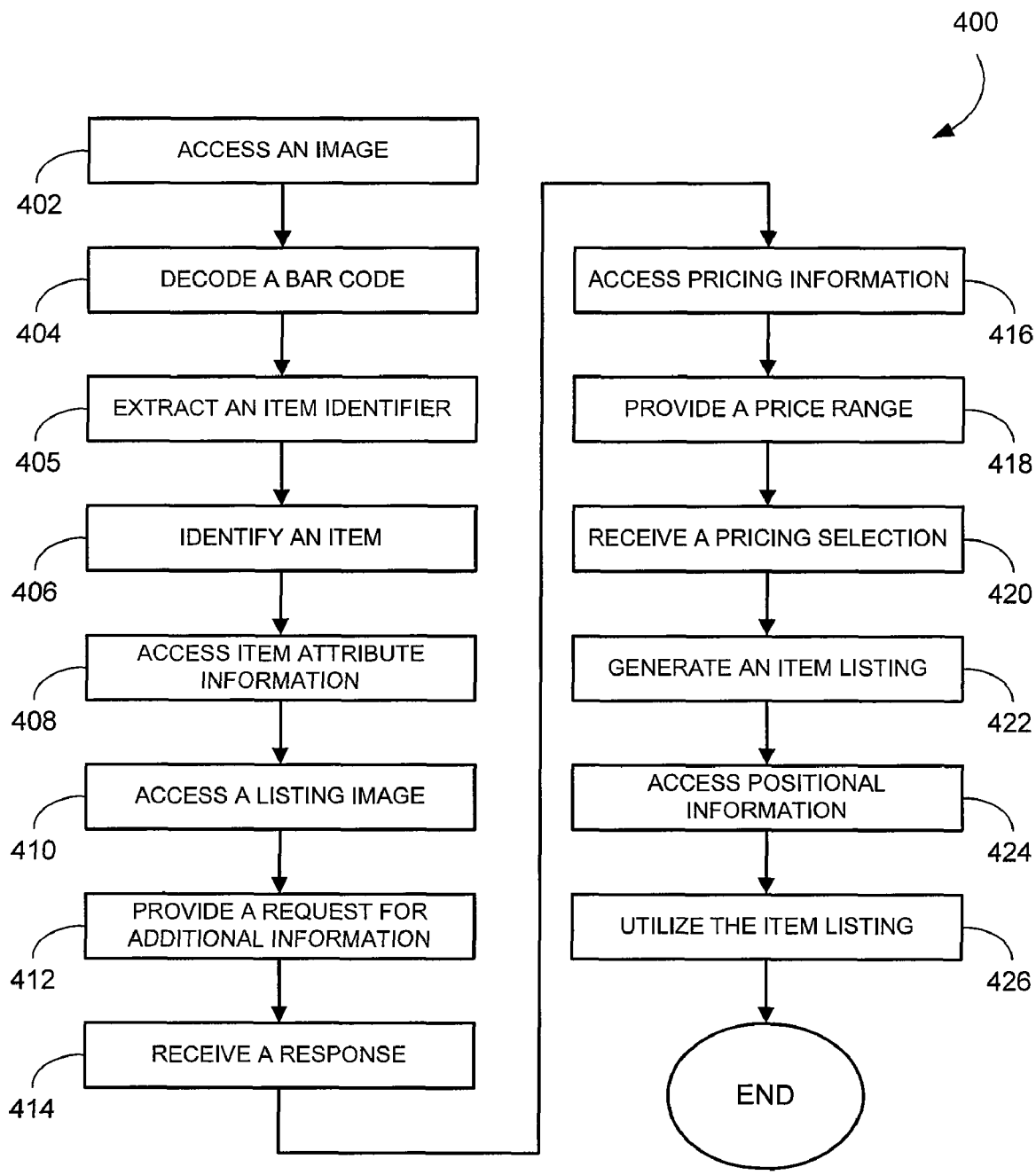
FIG. 4 is a flowchart illustrating a method for item listing utilization according to an example embodiment.

FIG. 4 illustrates a method 400 for item listing utilization according to an example embodiment. The method 400 may be performed by the hand-held device 102 and/or the listing manager 106 of the system 100 (see FIG. 1) or otherwise performed.

An image is accessed at block 402. The image may be accessed by capturing the image associated with the item on the hand-held device 102 and/or receiving the image from the hand-held device 102. The image may be otherwise accessed.

In an example embodiment, listing information may be provided with along with the captured image. For example, the captured image may be provided in a message to the listing manager 106 from the hand-held device 102 that includes information regarding a potential listing to be generated. The subject line and/or body of the message may indicate a type of request (e.g., a request to generation an item listing at a variable or fixed price), a starting price of the item listing, and duration for the item listing. Other information may also be provided with the message.

A bar code may be decoded from the image at block 404. The bar code may be decoded by a bar code reader Java SKD made by Tasman software, by a barcode SDK plug-in by LEAD Technologies, Inc, or different software and/or hardware.

An item identifier may be extracted from the image at block 405.

An item associated with the bar code and/or the item identifier is identified at block 406. For example, the bar code may be used to look up identification of the item.

The item attribute information 118 may be accessed at block 408. The item attribute information may be received from a user through e-mail, a text message, or otherwise received. The item attribute information 118 may be received at the same time (e.g. in the same e-mail) as the captured image or at a different time. The item attribute information 118 associated with the item may be accessed from the database 112, the information provider 122, or otherwise accessed.

The listing image 114 associated with the item may be accessed at block 410. The listing image 114 may be accessed from the database 112, the listing image 114 of the item may be captured on the hand-held device 102, and/or an image request may be provided to the imaging provider 120 and the listing image 114 of the item may be received from the imaging provider 120.

A request for additional information regarding the item may be provided at block 412. The additional information may include pricing information and/or item attribute information. Other information may also be requested. A response to the request may be received at block 414.

Pricing information for the item during a time period may be accessed (e.g., from the transactional data 116) at block 416. The pricing information may include start price, end price, discounted price, bid price, and the like. Other type of pricing information may also be accessed. A price range may be provided to the hand-held device 102 for presentation based on the obtained pricing information at block 418. At block 420, a pricing selection may be received from the hand-held device 102 based on the provided price range.

An item listing of the item is generated in accordance with the identifying of the item at block 422. The generating of the item listing of the item may be in accordance with the identification of the item, the access of the item attribute information 118, the receipt of the response, the access of the listing image 114, and/or the receipt of the pricing selection. Positional information may be accessed from the hand-held device 102 at block 424.

The item listing is utilized for posting with the listing manager 106 at block 426. The item listing may be posted or otherwise made available directly by the listing manager 106, provided from the hand-held device 102 to the listing manager 106 for posting, or otherwise utilized.

In an example embodiment, the utilization of the item listing may be in accordance with the receipt of the positional information. For example, one or more geographic posting areas may be selected based on the positional information.

Figure 5:
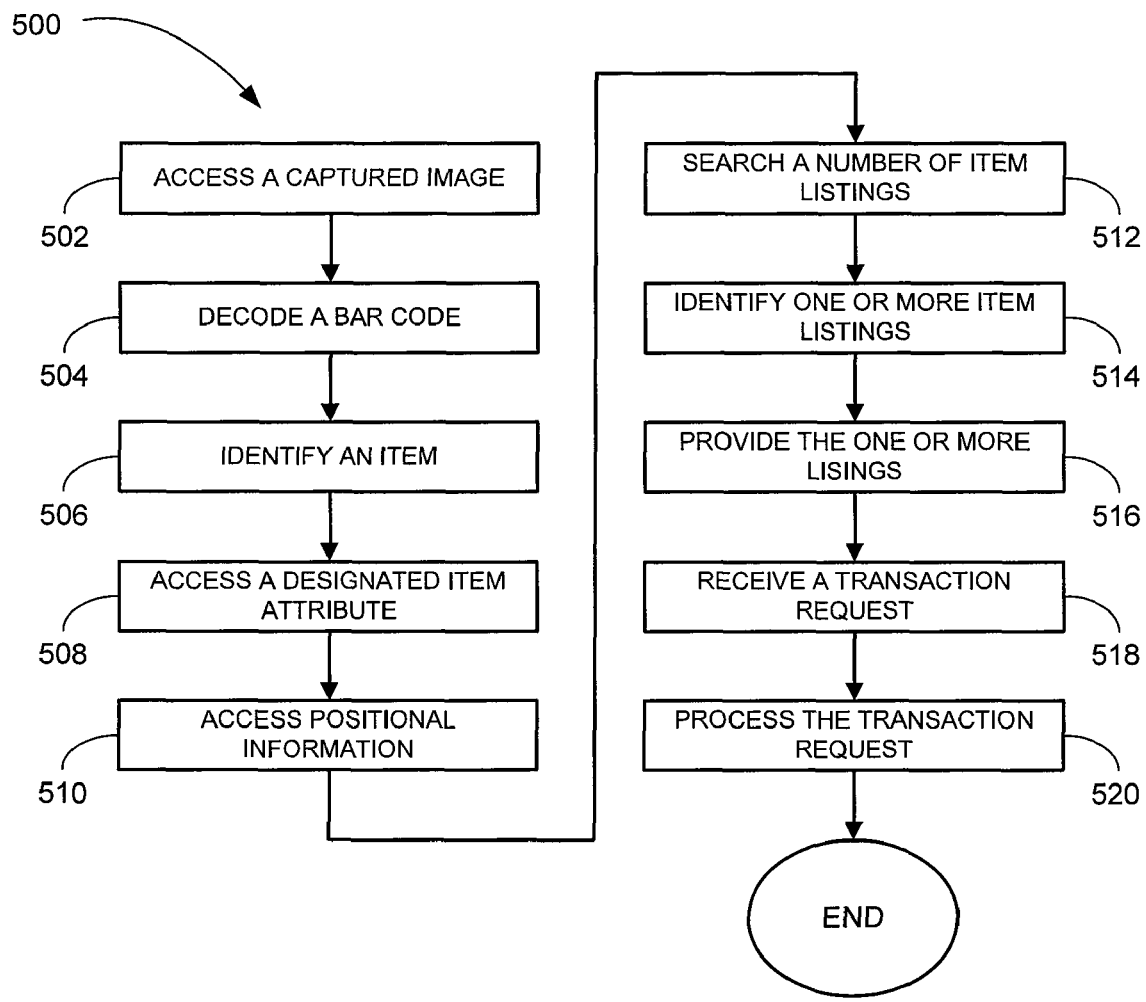
FIGS. 5 and 6 are flowcharts illustrating a method for listing identification according to an example embodiment.

FIG. 5 illustrates a method 500 for listing identification according to an example embodiment. The method 500 may be performed by the hand-held device 102 and/or the listing manager 106 of the system 100 (see FIG. 1) or otherwise performed.

A captured image is accessed at block 502.

In an example embodiment, access information may be provided with along with the captured image. For example, the captured image may be provided in a message to the listing manager 106 from the hand-held device 102 that includes information regarding desired listings. The subject line and/or body of the message may indicate a type of request (e.g., a request to view item listings at a variable or fixed price), a desired price of the item listing, and time left for the item listing. Other information may also be provided with the message.

A bar code is decoded from the captured image at block 504. An item associated with the bar code may be identified at block 506. The item may be identified by performing a lookup or may be otherwise identified.

A designated item attribute associated with a user may be accessed at block 508. The designated item attribute may include a user desired aspect of the item. For example, the designated item attribute may be a condition (e.g., "new" or "used"), an edition ("seventh edition"), or the like. Positional information may be accessed from the hand-held device 102 at block 510.

A number of item listings are searched for the item at block 512. The searching may be in accordance with the designated item attribute and/or the positional information. For example, the search may be restricted to items that have the designated item attribute and/or are located within a certain distance from the hand-held device 102.

One or more item listings for the item may be identified at block 514. The identification of the one or more item listings for the item may be in accordance with the search of the item listings, the access of the designated item attribute and/or the receipt of the positional information. For example, the positional information may be used to limit the item listings to a certain geographic area relative to the current location of the user.

At block 516, one or more item listings of the number of item listings may be provided for presentation in accordance with the searching of the number of item listings. For example, the five cheapest listings may be provided for presentation to the user.

A transaction request may be received at block 518. The transaction request may be a bid request, a purchase request, or a different type of transaction request. The transaction request for the item may be processed at block 520.

Figure 6:
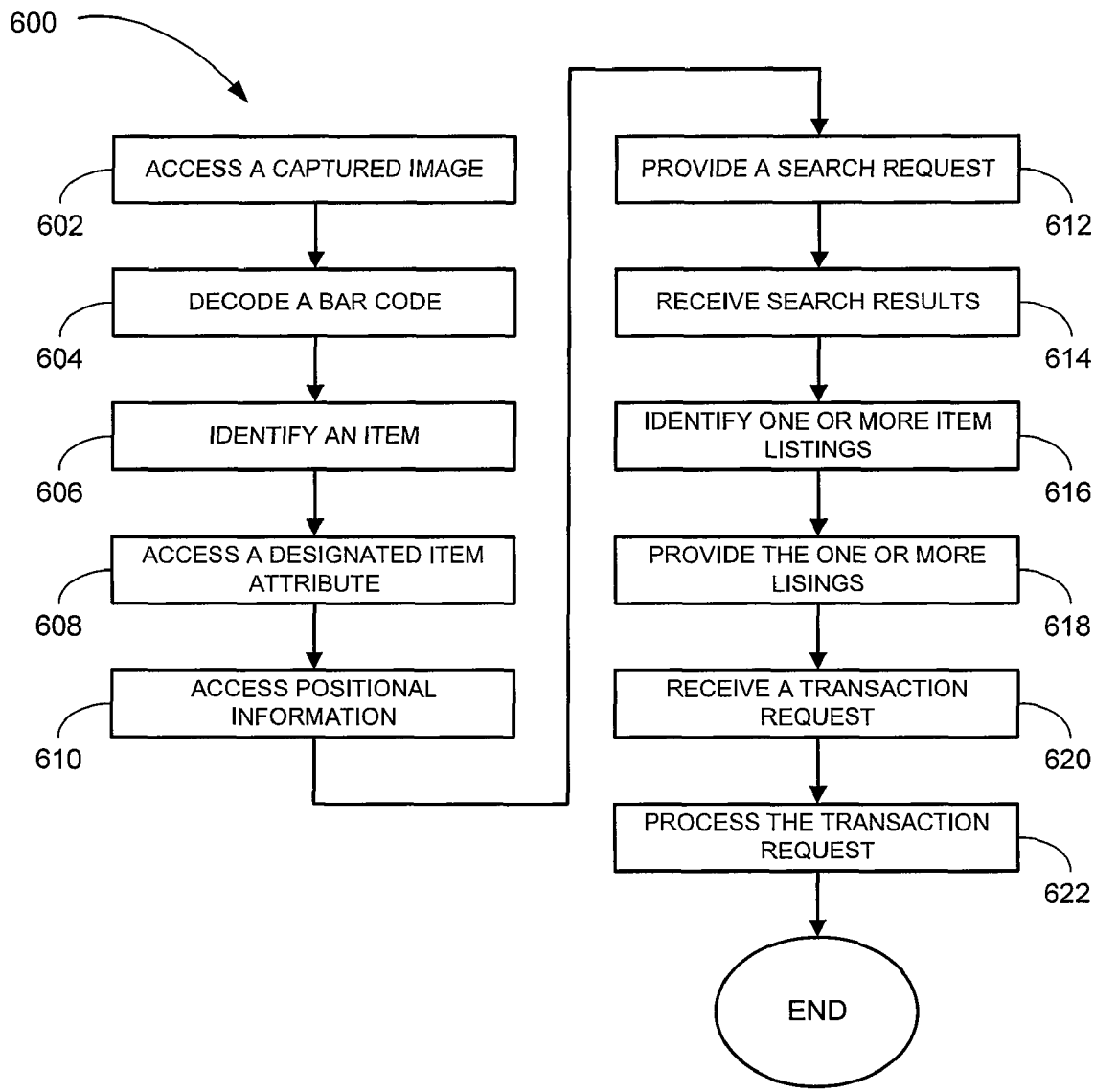

FIG. 6 illustrates a method 600 for listing identification according to an example embodiment. The method 600 may be performed by the hand-held device 102 and/or the listing manager 106 of the system 100 (see FIG. 1) or otherwise performed.

A captured image is accessed at block 602. A bar code is decoded from the captured image at block 604. An item associated with the bar code may be identified at block 606. A designated item attribute associated with a user may be accessed at block 608.

Positional information may be accessed from a hand-held device at block 610. At block 612, a search request for the item is sent to the listing manager 106. The search request may include the designated item attribute and/or the positional information. The search results are received from the listing manager 106 at block 614.

One or more item listings for the item may be identified at block 616. The identifying of the one or more item listings for the item may be in accordance with the receiving of the search results, the accessing of the designated item attribute and/or the receiving of the positional information. For example, the positional information may be used to limit the item listings to a certain geographic area relative to the current location of the user.

At block 618, one or more item listings of the number of item listings may be provided for presentation in accordance with the searching of the item listings. For example, the five cheapest listings may be provided for presentation to the user.

A transaction request may be received at block 620. The transaction request for the item may be processed at block 622.

Figure 7:
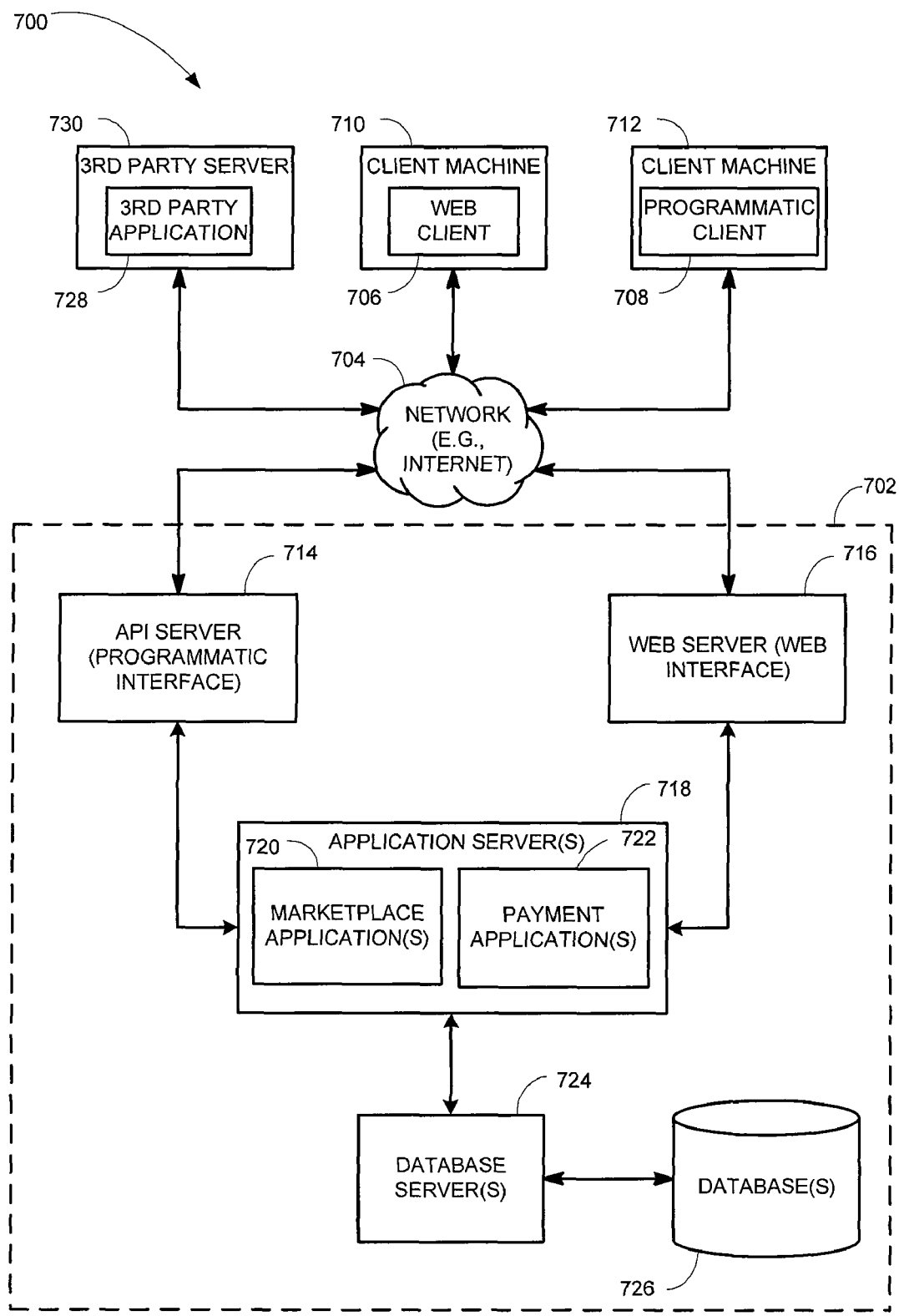
FIG. 7 is a network diagram depicting a network system, according to one embodiment, having a client server architecture configured for exchanging data over a network.

FIG. 7 is a network diagram depicting a client-server system 700, within which one example embodiment may be deployed. By way of example, a network 704 may include the functionality of the network 104, the listing manager 106 may be deployed within an application server 718, and the hand-held device 102 may include the functionality of a client machine 710 or a client machine 712. The system 100 may also be deployed in other systems.

A networked system 702, in the example forms of a network-based marketplace or publication system, provides server-side functionality, via a network 704 (e.g., the Internet or Wide Area Network (WAN)) to one or more clients. FIG. 7 illustrates, for example, a web client 706 (e.g., a browser, such as the Internet Explorer browser developed by Microsoft Corporation of Redmond, Wash. State), and a programmatic client 708 executing on respective client machines 710 and 712.

An Application Program Interface (API) server 714 and a web server 716 are coupled to, and provide programmatic and web interfaces respectively to, one or more application servers 718. The application servers 718 host one or more marketplace applications 720 and authentication providers 722. The application servers 718 are, in turn, shown to be coupled to one or more databases servers 724 that facilitate access to one or more databases 726.

The marketplace applications 720 may provide a number of marketplace functions and services to users that access the networked system 702. The authentication providers 722 may likewise provide a number of payment services and functions to users. The authentication providers 722 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 720. While the marketplace and authentication providers 720 and 722 are shown in FIG. 7 to both form part of the networked system 702, in alternative embodiments the authentication providers 722 may form part of a payment service that is separate and distinct from the networked system 702.

Further, while the system 700 shown in FIG. 7 employs a client-server architecture, the present invention is of course not limited to such an architecture, and could equally well find application in a distributed, or peer-to-peer, architecture system, for example. The various marketplace and authentication providers 720 and 722 could also be implemented as standalone software programs, which need not have networking capabilities.

The web client 706 accesses the various marketplace and authentication providers 720 and 722 via the web interface supported by the web server 716. Similarly, the programmatic client 708 accesses the various services and functions provided by the marketplace and authentication providers 720 and 722 via the programmatic interface provided by the API server 714. The programmatic client 708 may, for example, be a seller application (e.g., the TurboLister™ application developed by eBay Inc., of San Jose, Calif.) to enable sellers to author and manage listings on the networked system 702 in an off-line manner, and to perform batch-mode communications between the programmatic client 708 and the networked system 702.

FIG. 7 also illustrates a third party application 728, executing on a third party server machine 730, as having programmatic access to the networked system 702 via the programmatic interface provided by the API server 714. For example, the third party application 728 may, utilizing information retrieved from the networked system 702, support one or more features or functions on a website hosted by the third party. The third party may, for example, provide one or more promotional, marketplace or payment functions that are supported by the relevant applications of the networked system 702.

Figure 8:
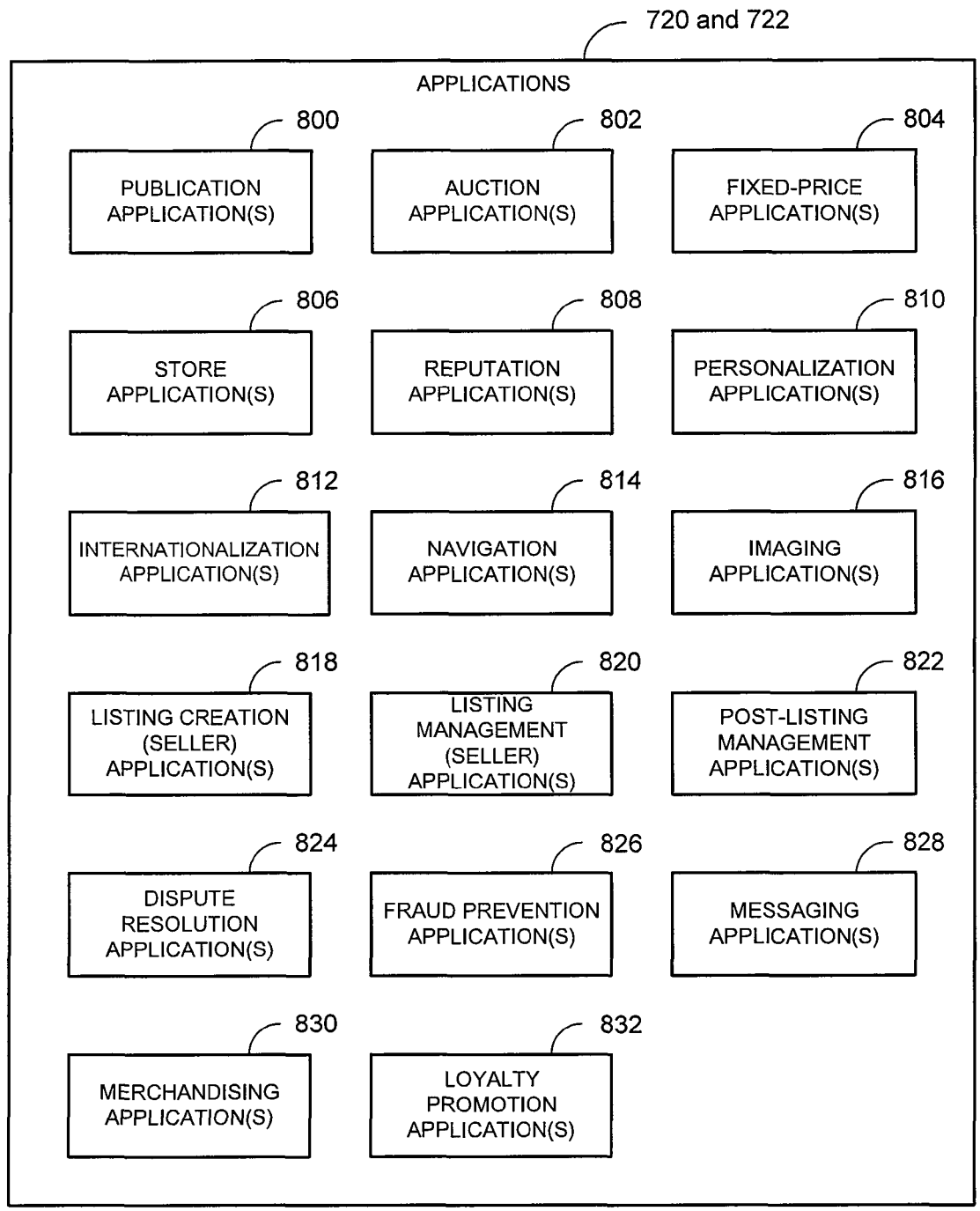
FIG. 8 is a block diagram illustrating an example embodiment of multiple network and marketplace applications, which are provided as part of the network-based marketplace.

FIG. 8 is a block diagram illustrating multiple applications 720 and 722 that, in one example embodiment, are provided as part of the networked system 702 (see FIG. 7). The applications 720 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 726 via the database servers 724.

The networked system 702 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 720 are shown to include at least one publication application 800 and one or more auction applications 802 which support auction-format listing and price setting mechanisms (e.g., English, Dutch, Vickrey, Chinese, Double, Reverse auctions etc.). The various auction applications 802 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 804 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 806 allow a seller to group listings within a "virtual" store, which may be branded and otherwise personalized by and for the seller. Such a virtual store may also offer promotions, incentives and features that are specific and personalized to a relevant seller.

Reputation applications 808 allow users that transact, utilizing the networked system 702, to establish, build and maintain reputations, which may be made available and published to potential trading partners. Consider that where, for example, the networked system 702 supports person-to-person trading, users may otherwise have no history or other reference information whereby the trustworthiness and credibility of potential trading partners may be assessed. The reputation applications 808 allow a user, for example through feedback provided by other transaction partners, to establish a reputation within the networked system 702 over time. Other potential trading partners may then reference such a reputation for the purposes of assessing credibility and trustworthiness.

Personalization applications 810 allow users of the networked system 702 to personalize various aspects of their interactions with the networked system 702. For example a user may, utilizing an appropriate personalization application 810, create a personalized reference page at which information regarding transactions to which the user is (or has been) a party may be viewed. Further, a personalization application 810 may enable a user to personalize listings and other aspects of their interactions with the networked system 702 and other parties.

The networked system 702 may support a number of marketplaces that are customized, for example, for specific geographic regions. A version of the networked system 702 may be customized for the United Kingdom, whereas another version of the networked system 702 may be customized for the United States. Each of these versions may operate as an independent marketplace, or may be customized (or internationalized and/or localized) presentations of a common underlying marketplace. The networked system 702 may accordingly include a number of internationalization applications 812 that customize information (and/or the presentation of information) by the networked system 702 according to predetermined criteria (e.g., geographic, demographic or marketplace criteria). For example, the internationalization applications 812 may be used to support the customization of information for a number of regional websites that are operated by the networked system 702 and that are accessible via respective web servers 716.

Navigation of the networked system 702 may be facilitated by one or more navigation applications 814. For example, a search application (as an example of a navigation application) may enable key word searches of listings published via the networked system 702. A browse application may allow users to browse various category, catalogue, or system inventory structures according to which listings may be classified within the networked system 702. Various other navigation applications may be provided to supplement the search and browsing applications.

In order to make listings available via the networked system 702 as visually informing and attractive as possible, the marketplace applications 720 may include one or more imaging applications 816 utilizing which users may upload images for inclusion within listings. An imaging application 816 also operates to incorporate images within viewed listings. The imaging applications 816 may also support one or more promotional features, such as image galleries that are presented to potential buyers. For example, sellers may pay an additional fee to have an image included within a gallery of images for promoted items.

Listing creation applications 818 allow sellers conveniently to author listings pertaining to goods or services that they wish to transact via the networked system 702, and the listing creation application 818 may include the functionality of the item listing subsystem 108 (see FIG. 1).

The listing management applications 820 allow sellers to manage listings. Specifically, where a particular seller has authored and/or published a large number of listings, the management of such listings may present a challenge. The listing management applications 820 provide a number of features (e.g., auto-relisting, inventory level monitors, etc.) to assist the seller in managing such listings. One or more post-listing management applications 822 also assist sellers with a number of activities that typically occur post-listing. For example, upon completion of an auction facilitated by one or more auction applications 802, a seller may wish to leave feedback regarding a particular buyer. To this end, a post-listing management application 822 may provide an interface to one or more reputation applications 808, so as to allow the seller conveniently to provide feedback regarding multiple buyers to the reputation applications 808.

Dispute resolution applications 824 provide mechanisms whereby disputes arising between transacting parties may be resolved. For example, the dispute resolution applications 824 may provide guided procedures whereby the parties are guided through a number of steps in an attempt to settle a dispute. In the event that the dispute cannot be settled via the guided procedures, the dispute may be escalated to a merchant mediator or arbitrator.

A number of fraud prevention applications 826 implement fraud detection and prevention mechanisms to reduce the occurrence of fraud within the networked system 702.

Messaging applications 828 are responsible for the generation and delivery of messages to users of the networked system 702, such messages for example advising users regarding the status of listings at the networked system 702 (e.g., providing "outbid" notices to bidders during an auction process or to provide promotional and merchandising information to users). Respective messaging applications 828 may utilize any one have a number of message delivery networks and platforms to deliver messages to users. For example, messaging applications 828 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 830 support various merchandising functions that are made available to sellers to enable sellers to increase sales via the networked system 702. The merchandising applications 830 also operate the various merchandising features that may be invoked by sellers, and may monitor and track the success of merchandising strategies employed by sellers.

The networked system 702 itself, or one or more parties that transact via the networked system 702, may operate loyalty programs that are supported by one or more loyalty/promotions applications 832. For example, a buyer may earn loyalty or promotions points for each transaction established and/or concluded with a particular seller, and may be offered a reward for which accumulated loyalty points can be redeemed.

Figure 9:
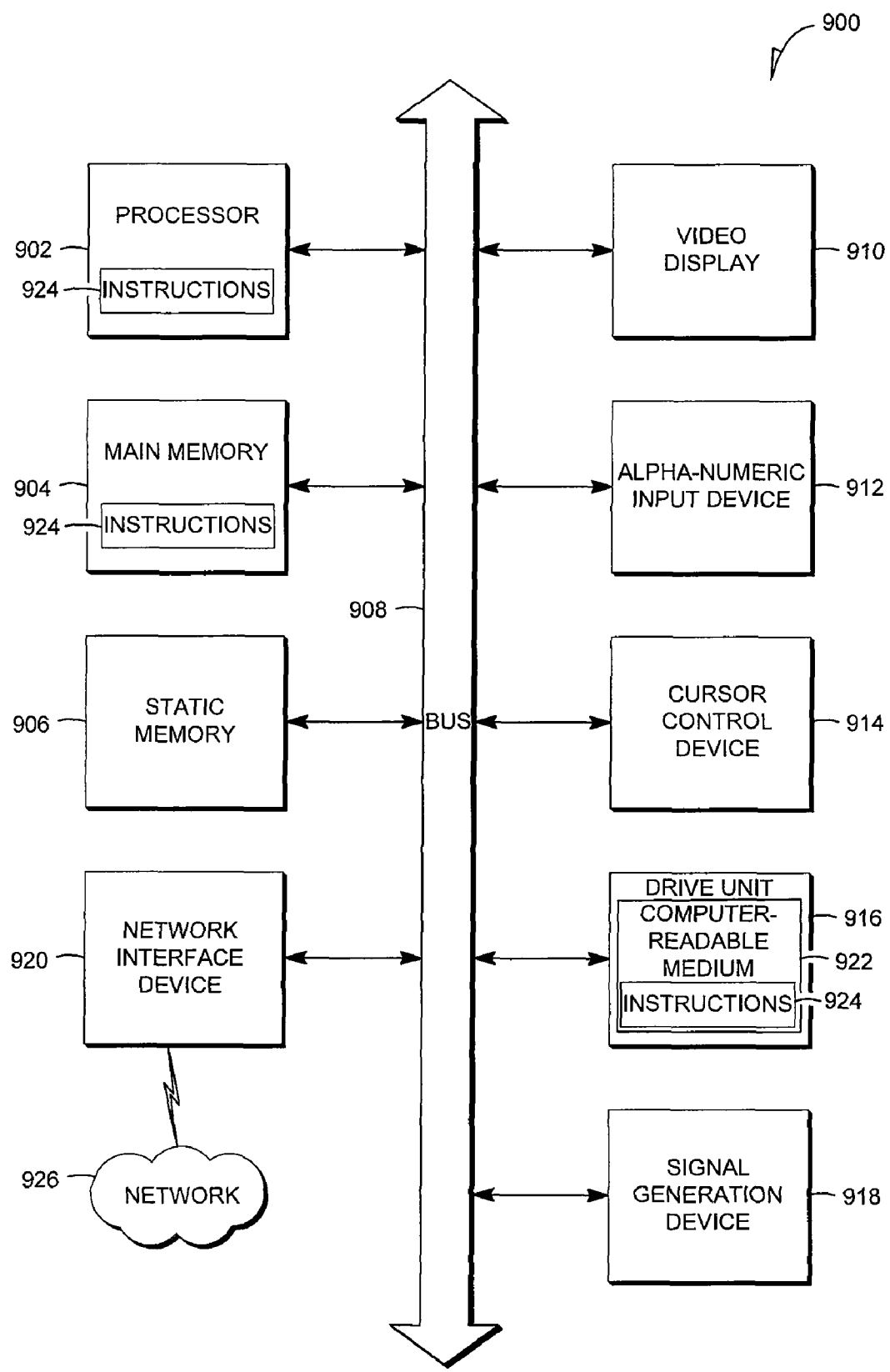
FIG. 9 is a block diagram diagrammatic representation of machine in the example form of a computer system within which a set of instructions for causing the machine to perform any one or more of the methodologies discussed herein may be executed.

FIG. 9 shows a diagrammatic representation of machine in the example form of a computer system 900 within which a set of instructions may be executed causing the machine to perform any one or more of the methods, processes, operations, or methodologies discussed herein. The hand-held device 102 (see FIG. 1) may include the functionality of the computer system 900. The listing manager 106, the imaging provider 120, and/or the information provider 122 (see FIG. 1) may be deployed on the computer system 900.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU) a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a drive unit 916, a signal generation device 918 (e.g., a speaker) and a network interface device 920.

The drive unit 916 includes a machine-readable medium 922 on which is stored one or more sets of instructions (e.g., software 924) embodying any one or more of the methodologies or functions described herein. The software 924 may also reside, completely or at least partially, within the main memory 904 and/or within the processor 902 during execution thereof by the computer system 900, the main memory 904 and the processor 902 also constituting machine-readable media.

The software 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for mobile publication have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
    accessing an image;
    decoding a bar code from the image; and
    listing for sale an item identified by the decoded bar code in the image, comprising:
        identifying the item associated with the bar code in the image;
        generating an item listing of the item associated with the bar code, the item listing offering for sale the item associated with the bar code; and
        utilizing the item listing for posting with a listing manager by providing the item listing to the listing manager to list the item for sale.

2. The computer-implemented method of claim 1, further comprising:
    accessing positional information from a hand-held device to identify a location of a user of the hand-held device, wherein generating the item listing includes adding a geographical area relative to the location of the user of the hand-held device to the item listing.

3. The computer-implemented method of claim 1, further comprising:
    accessing positional information from a hand-held device to identify a location of a user of the hand-held device, wherein utilizing the item listing includes providing the item listing to the listing manager to offer the item for sale in a geographical area relative to the location of the user of the hand-held device.

4. The computer-implemented method of claim 3, wherein the positional information includes at least one of GPS source data, GPS assisted data, triangulation data, or cellular identification (ID) data in the form of location coordinates for the hand-held device.

5. The computer-implemented method of claim 1, further comprising:
    accessing item attribute information associated with the item,
    wherein the generating of the item listing is in accordance with the identifying of the item and the accessing of the item attribute information.

6. The computer-implemented method of claim 5, wherein the item attribute information includes an edition, a number of pages, an author, chapter titles, song titles, actors, or combinations thereof.

7. The computer-implemented method of claim 1, further comprising:
    providing a request for additional information regarding the item; and
    receiving a response to the request,
    wherein the generating of the item listing is in accordance with the identifying of the item and the receiving of the response.

8. The computer-implemented method of claim 7, wherein the additional information includes pricing information, item attribute information, or combinations thereof.

9. The computer-implemented method of claim 1, further comprising:
    accessing pricing information for the item during a time period;
    providing a price range to a hand-held device for presentation in accordance with the accessing of the pricing information; and
    receiving a pricing selection from the hand-held device in accordance with the providing of the price range,
    wherein the generating of the item listing of the item is in accordance with the receiving of the pricing selection.

10. The computer-implemented method of claim 1, wherein the accessing of the image comprises:
    capturing the image associated with the item.

11. The computer-implemented method of claim 1, wherein the accessing of the image comprises:
    receiving the image from a hand-held device.

12. The computer-implemented method of claim 1, further comprising:
    accessing a listing image associated with the item, wherein the generating of the item listing of the item is in accordance with the identifying of the item and the accessing of the listing image.

13. The computer-implemented method of claim 12, wherein the accessing of the listing image comprises:
capturing the listing image of the item.

14. A computer-implemented method comprising:
accessing an image;
decoding a bar code from the image;
accessing positional information from a hand-held device to identify a location of a user of the hand-held device; and
returning at least one item listing using the decoded bar code in the image, comprising:
identifying an item associated with the bar code in the image;
identifying the at least one item listing for the item, each item listing offering for sale the item associated with the decoded bar code, by using the location of the user of the hand-held device to limit a search for the at least one item listing; and
providing an item listing of the identified at least one item listing for presentation.

15. The computer-implemented method of claim 14, further comprising:
receiving a purchase request for an item of a particular listing of the at least one item listing; and
processing the purchase request for the item.

16. The computer-implemented method of claim 14, further comprising:
receiving a bid request for an item of a particular listing of the at least one item listing; and
processing the bid request for the item.

17. The computer-implemented method of claim 14, further comprising:
searching a plurality of item listings for the item,
wherein the identifying of the one or more item listings is in accordance with the searching of the plurality of item listings.

18. The computer-implemented method of claim 14, further comprising:
sending a search request for the item to a listing manager; and
receiving the one or more item listings for the item,
wherein the identifying of the one or more item listings is in accordance with the receiving of the one or more item listings.

19. The computer-implemented method of claim 14, wherein identifying the at least one item listing includes searching for the at least one item listing within a specified distance from the location of the user of the hand-held device.

20. The computer-implemented method of claim 14, further comprising:
accessing a designated item attribute associated with a user,
wherein the identifying of the one or more item listings for the item is in accordance with the accessing of the designated item attribute.

21. A non-transitory machine-readable medium comprising instructions, which when implemented by one or more processors perform operations comprising:
accessing a image;
extracting an item identifier from the image; and
listing for sale an item identified by the item identifier in the image, comprising:
identifying the item associated with the item identifier in the image;
generating an item listing of the item in accordance with the identifying of the item; the item listing offering for sale the item identified by the item identifier in the image; and
utilizing the item listing for posting with a listing manager by providing the item listing to the listing manager to list the item for sale.

22. The non-transitory machine-readable medium of claim 21 further comprising instructions, which when implemented by one or more processors perform operations comprising:
accessing a listing image associated with the item,
wherein the generating the item listing of the item is in accordance with identification of the item and the access of the listing image.

23. A non-transitory machine-readable medium comprising instructions, which when implemented by one or more processors perform operations comprising:
accessing an image;
determining an item identifier from the image;
accessing positional information from a hand-held device to identify a location of a user of the hand-held device; and
returning at least one item listing using the item identifier in the image, comprising:
identifying an item associated with the item identifier in the image;
identifying at least one item listing for the item, each item listing offering for sale the item associated with the item identifier, by using the location of the user of the hand-held device to limit a search for the at least one item listing; and
providing an item listing of the identified at least one item listing for presentation.

24. The non-transitory machine-readable medium of claim 23 further comprising instructions, which when implemented by one or more processors perform operations comprising:
receiving a bid request for an item of a particular listing of the at least one item listing; and
processing the bid request for the item.

25. A system comprising:
an image access module to access a image;
a bar code decoding module to decode a bar code from the image accessed by the image access module;
an item identification module to identify an item associated with the bar code decoded by the bar code decoding module to be listed for sale;
an item listing generation module to generate an item listing of the item in accordance with identification of the item by the item identification module;
an item listing utilization module to utilize the item listing generated by the item listing generation module for posting with a listing manager by providing the item listing to the listing manager to list the item for sale; and
a processor configured to execute at least one of the image access module, the bar code decoding module, the item identification module, the item listing generation module, and the item listing utilization module.

* * * * *

UNITED STATES PATENT AND TRADEMARK OFFICE
CERTIFICATE OF CORRECTION

| | | |
|---|---|---|
| PATENT NO. | : 8,086,502 B2 | Page 1 of 1 |
| APPLICATION NO. | : 12/058827 | |
| DATED | : December 27, 2011 | |
| INVENTOR(S) | : Vishwa Krishnamurthy et al. | |

It is certified that error appears in the above-identified patent and that said Letters Patent is hereby corrected as shown below:

On Drawing Sheet 1 of 9, Reference Numeral 108, Box 106, Figure 1, line 2, delete "SUBSTSTEM" and insert -- SUBSYSTEM --, therefor.

On Drawing Sheet 5 of 9, Box 516, Figure 5, line 2, delete "LISINGS" and insert -- LISTINGS --, therefor.

On Drawing Sheet 6 of 9, Box 618, Figure 6, line 2, delete "LISINGS" and insert -- LISTINGS --, therefor.

Signed and Sealed this
Sixth Day of March, 2012

David J. Kappos
*Director of the United States Patent and Trademark Office*